US007976423B2

(12) United States Patent
Valente

(10) Patent No.: US 7,976,423 B2

(45) **Date of Patent: *Jul. 12, 2011**

(54) PRE-LOAD MECHANISM FOR HELICAL GEAR DIFFERENTIAL

(75) Inventor: Paul J. Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/889,056

(22) Filed: Sep. 23, 2010

(65) Prior Publication Data

US 2011/0015025 A1 Jan. 20, 2011

Related U.S. Application Data

(63) Continuation of application No. 11/880,376, filed on Jul. 20, 2007, now Pat. No. 7,837,588.

(51) Int. Cl.
*F16H 48/10* (2006.01)

(52) U.S. Cl. ........................................ 475/249; 475/252

(58) Field of Classification Search .................. 475/249, 475/252

See application file for complete search history.

(56) References Cited

U.S. PATENT DOCUMENTS 2,269,734 A 1/1942 Powell
3,375,736 A 4/1968 Saari
3,706,239 A 12/1972 Myers
3,893,351 A 7/1975 Baremor
4,365,524 A 12/1982 Dissett et al.
4,677,876 A 7/1987 Dissett
4,722,244 A 2/1988 Tsuchiya et al.
4,751,853 A 6/1988 Dissett
5,055,096 A 10/1991 Riemscheid et al.
5,122,101 A 6/1992 Tseng
5,122,102 A 6/1992 Chludek et al.
5,139,467 A 8/1992 Carpenter
5,221,238 A 6/1993 Bawks et al.
5,292,291 A 3/1994 Ostertag
5,342,256 A 8/1994 Amborn et al.
5,389,048 A 2/1995 Carlson
5,492,510 A 2/1996 Bowerman
5,554,081 A 9/1996 Bowerman
5,580,326 A 12/1996 Teraoka
5,671,640 A 9/1997 Valente
5,730,679 A 3/1998 Ichiki
5,733,216 A 3/1998 Bowerman
5,823,907 A 10/1998 Teraoka et al.
5,842,946 A 12/1998 Ichiki
5,951,431 A 9/1999 Downs et al.
5,957,801 A 9/1999 Barnes, II (Continued)

FOREIGN PATENT DOCUMENTS

DE 4023332 A1 3/1992

(Continued)

*Primary Examiner* — David D Le
*Assistant Examiner* — Erin D Bishop
(74) *Attorney, Agent, or Firm* — Harness, Dickey & Pierce, P.L.C.

(57) ABSTRACT

A differential assembly for a vehicle includes a differential casing rotatable about an axis. The differential casing defines a cavity. A pair of side gears is disposed within the differential casing cavity. First and second pairs of pinion gears are rotatably positioned in the cavity in driving engagement with the side gears. A thrust block has circumferentially spaced apart recesses. Rotation of the thrust block is restricted by the first and second pairs of pinion gears being in communication with the recesses. A spring biases the thrust block into engagement with one of the side gears.

20 Claims, 4 Drawing Sheets

U.S. PATENT DOCUMENTS

| | | | |
|---|---|---|---|
| 5,983,754 | A | 11/1999 | Tyson et al. |
| 5,984,823 | A | 11/1999 | Gage |
| 6,013,004 | A | 1/2000 | Gage et al. |
| 6,053,838 | A | 4/2000 | Gage |
| 6,139,462 | A | 10/2000 | Gage et al. |
| 6,146,727 | A | 11/2000 | Dannels |
| 6,533,697 | B2 | 3/2003 | Morse et al. |
| 6,540,640 | B2 | 4/2003 | Hibbler et al. |
| 7,022,041 | B2 | 4/2006 | Valente |
| 7,147,585 | B2 | 12/2006 | Valente |
| 7,232,399 | B2 | 6/2007 | Valente |
| 2002/0025878 | A1 | 2/2002 | Kam |
| 2003/0101848 | A1 | 6/2003 | Handa et al. |
| 2005/0197229 | A1 | 9/2005 | Valente |

FOREIGN PATENT DOCUMENTS

| | | | |
|---|---|---|---|
| EP | 356401 | A2 | 2/1990 |
| GB | 2212231 | A | 7/1989 |
| JP | 2000110920 | A | 4/2000 |

46
50
56
58
60
62
64
68a
70a
70b
78a
78b
82a
82b
84a
84b
86
90a
92
96
99
126
128
130
132

70a
68a
78a
128
154
174a
164a
174b
164b
150
152
166a
186a
172b
162b
182b
172a
184a
184b
176a
176b
170b
170a
166b
162a
182a
186b
160b
180b
160a
180a
156
134
136
126
138
140

PRE-LOAD MECHANISM FOR HELICAL GEAR DIFFERENTIAL

CROSS-REFERENCE TO RELATED APPLICATIONS

This application is a continuation of U.S. Ser. No. 11/880,376 filed Jul. 20, 2007, the disclosure of which is incorporated by reference as if fully set forth in detail herein.

BACKGROUND

The present disclosure relates to differentials for use in automotive drivelines and, more particularly, to a helical gear differential having pre-loaded side gears.

Differentials of the type used in automotive drivelines generally may include a planetary gearset supported within a differential casing to facilitate relative rotation (i.e., speed differentiation) between a pair of output shafts. The planetary gearset may include helical side gears fixed for rotation with the ends of the output shafts, which are meshed with paired sets of helical pinion gears. This type of machine is known as a parallel axis helical gear differential.

In some differentials it may be desirable to pre-load the differential to provide a limited-slip driveline arrangement. Some differentials are equipped with springs to increase the force required to overcome friction between moveable differential components. The springs are engaged with the side gears and may exhibit wear.

SUMMARY

In one form, the present disclosure provides a differential assembly for a vehicle including a differential casing rotatable about an axis. The differential casing defines a cavity. A pair of side gears is disposed within the differential casing cavity. First and second pairs of pinion gears are rotatably positioned in the cavity in driving engagement with the side gears. A thrust block has circumferentially spaced apart recesses. Rotation of the thrust block is restricted by the first and second pairs of pinion gears being in communication with the recesses. A spring biases the thrust block into engagement with one of the side gears.

In another form, the present disclosure provides a differential assembly that includes a differential casing, first and second side gears received in the differential casing, a plurality of first pinion gears meshingly engaged with the first side gear, a plurality of second pinion gears meshingly engaged with the second side gear and the first side gear, a first thrust block and a spring. The first thrust block is received between the differential casing and the first side gear on a side of the differential casing opposite the second side gear. The first thrust block has circumferentially spaced apart recesses. The spring biases the first thrust block into engagement with the first side gear. The first side gear is disposed between the spring and the second side gear such that the spring biases the first side gear toward the second side gear. At least one of the first pinion gears is received in an associated one of the recesses in the first thrust block to thereby inhibit rotation of the first thrust block relative to the differential casing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
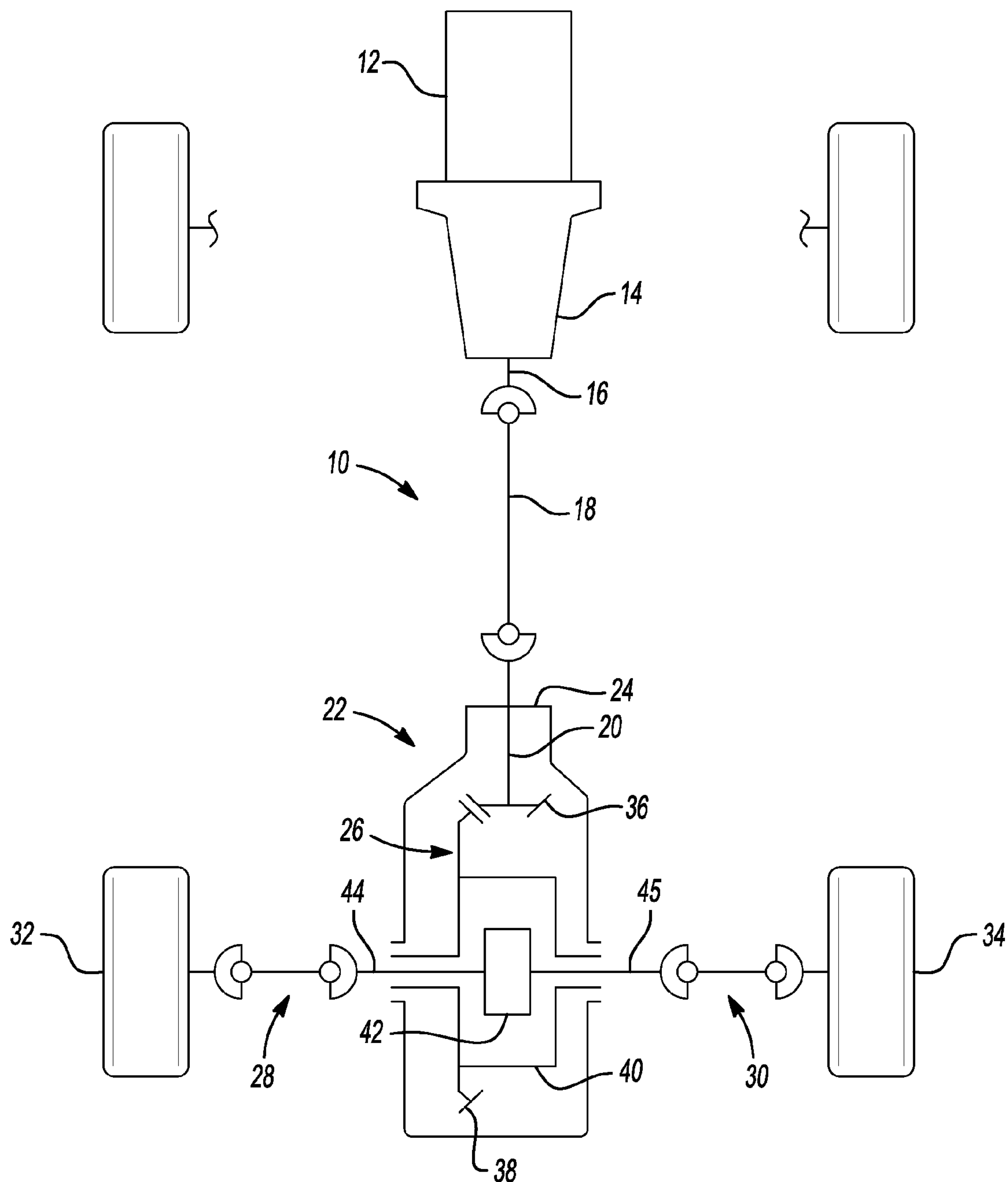
FIG. 1 is a schematic view of an exemplary motor vehicle including a differential assembly constructed in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

With initial reference to FIG. 1, a drivetrain 10 for an exemplary motor vehicle may include an engine 12, a transmission 14 having an output shaft 16, and a propeller shaft 18 connecting the output shaft 16 to a pinion shaft 20 of a rear axle assembly 22. The rear axle assembly 22 includes an axle housing 24, a differential assembly 26 supported in the axle housing 24, and a pair of axle shafts 28 and 30, respectively, interconnected to a left and right rear wheel 32 and 34, respectively. The pinion shaft 20 has a pinion shaft gear 36 fixed thereto which drives a ring gear 38 that may be fixed to a differential casing 40 of the differential assembly 26. A gearset 42 supported within the differential casing 40 transfers rotary power from the casing 40 to a pair of output shafts 44 and 45 connected to the axle shafts 28 and 30, respectively, and facilitates relative rotation (i.e., differentiation) therebetween. While the differential assembly 26 is shown in a rear-wheel drive application, the present invention is contemplated for use in differential assemblies installed in transaxles for use in front-wheel drive vehicles, and/or in transfer cases for use in four-wheel drive vehicles.

Figure 2:
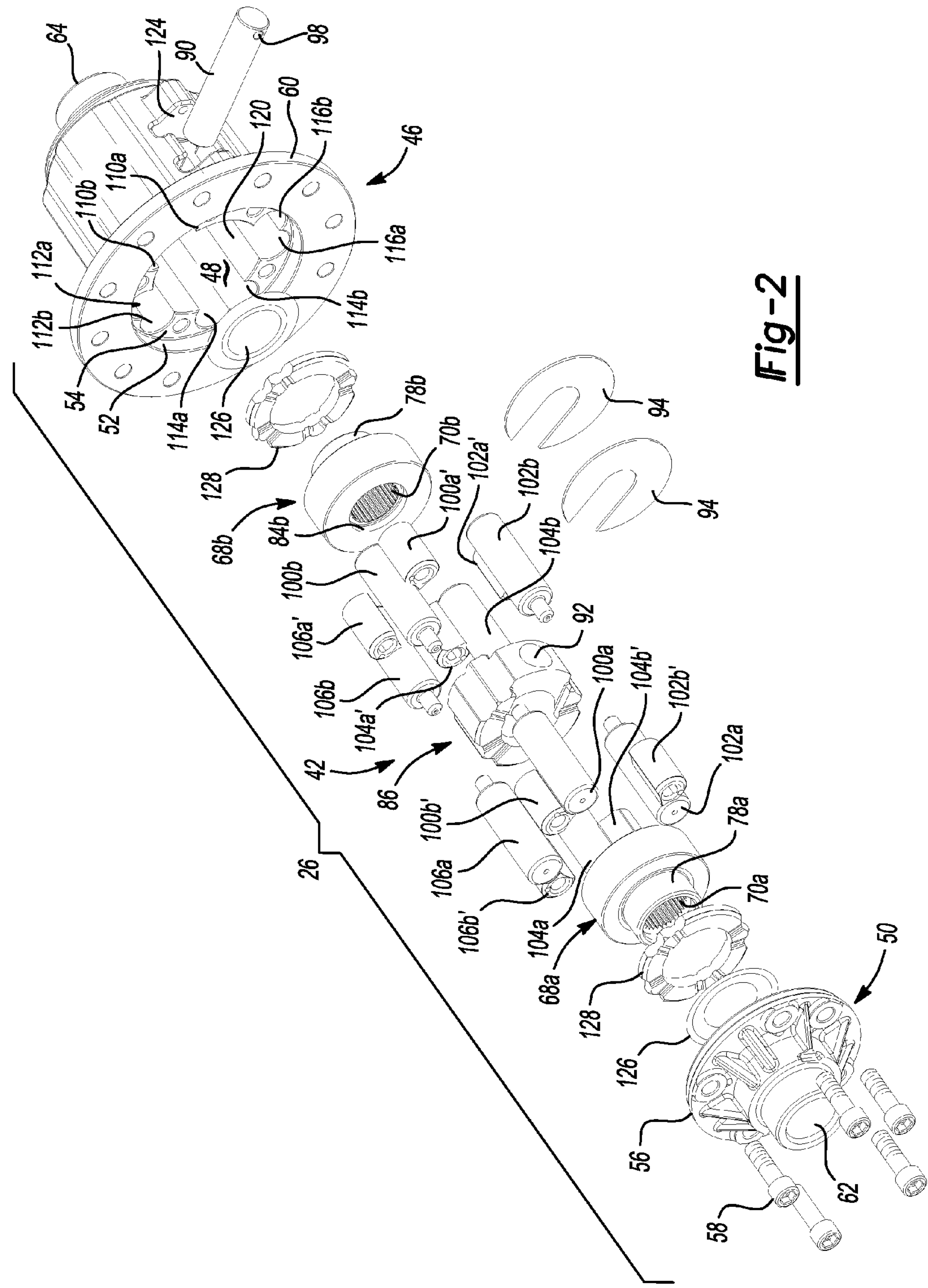
FIG. 2 is an exploded perspective view of the differential assembly of FIG. 1.
Figure 3:
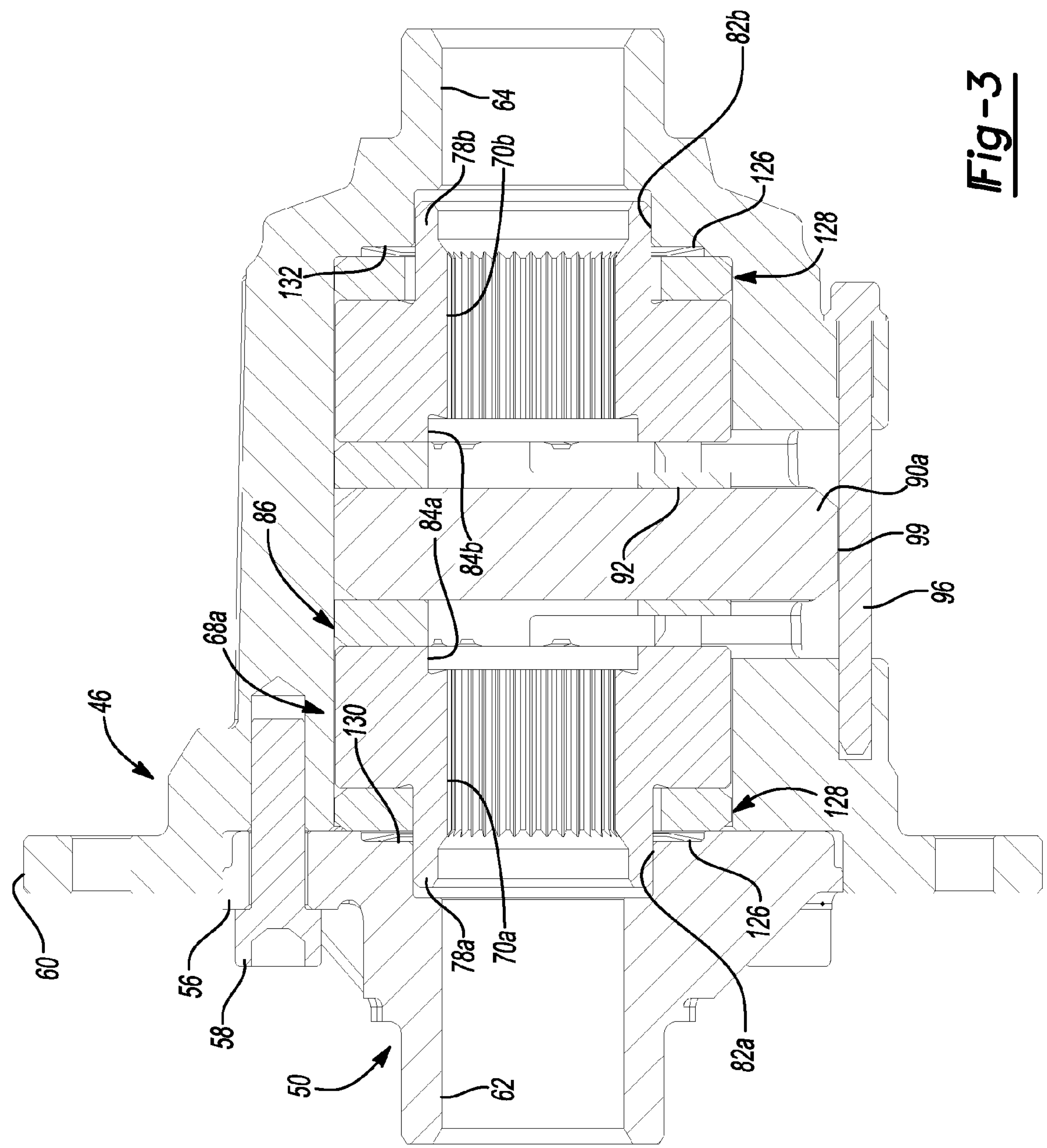
FIG. 3 is a cross-sectional side view of the differential assembly of FIG. 2.
Figure 4:
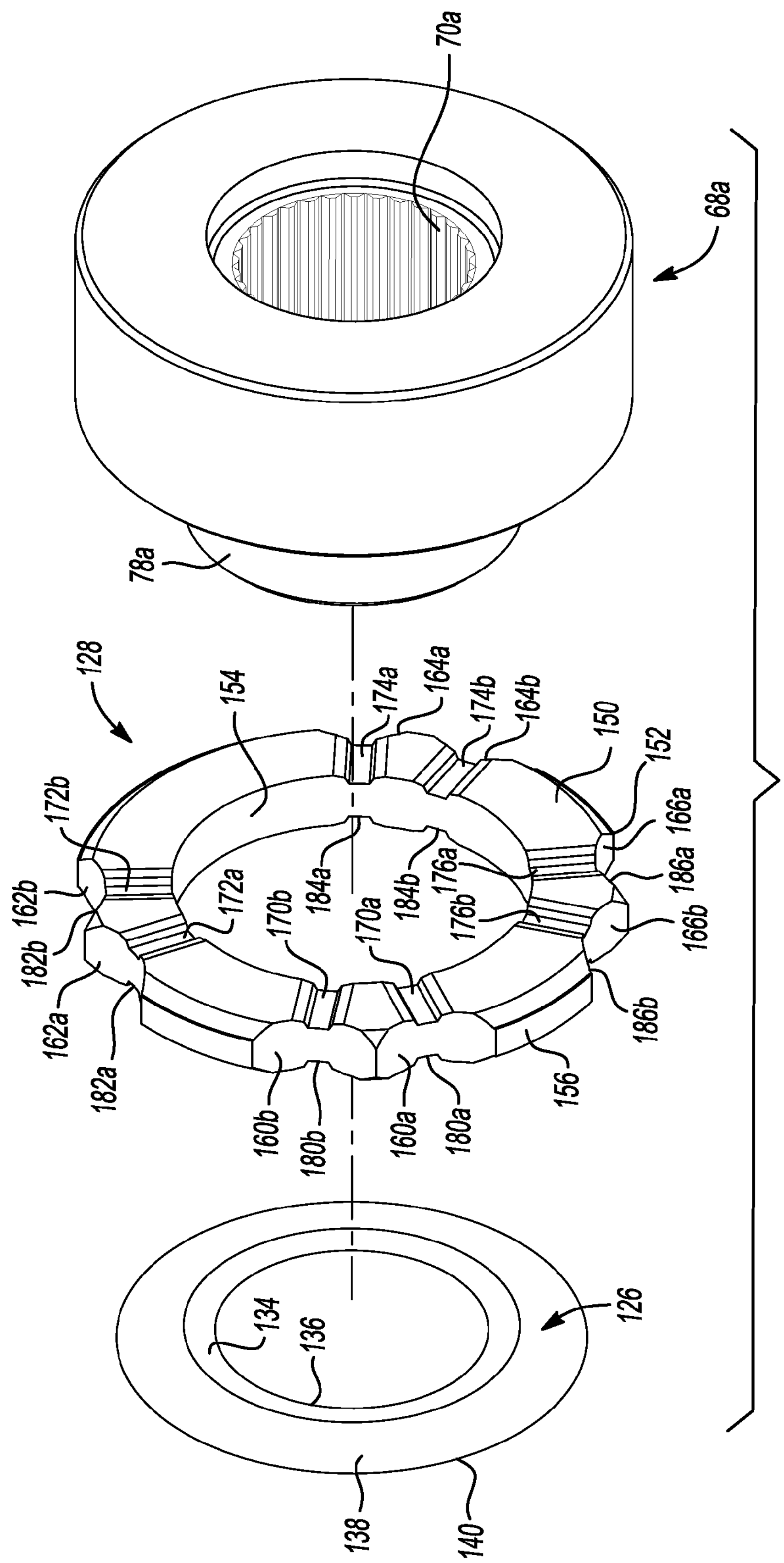
FIG. 4 is a partial exploded perspective view of the differential assembly of FIG. 1.

Turning now to FIGS. 2-4, the differential assembly 26 will be described in further detail. The differential assembly 26 may be a parallel-axis helical-gear type differential and includes the differential casing 40. The differential casing 40 includes a main drum or body 46, which defines an internal cavity or chamber 48, and an end cap 50. Body 46 includes a recess 52 having a mounting surface 54 shaped to mate with a radial flange 56 of cap 50. The body 46 and cap 50 are secured together by a plurality of bolts 58. As is known, a ring or bevel gear can be fixed to a radial flange 60 on the differential casing 40 to transfer rotary power (i.e., drive torque) thereto. The differential casing 40 defines a pair of axially aligned openings 62 and 64 in communication with the internal chamber 48. The axially aligned openings 62 and 64 are adapted to receive the end segments of the pair of driving output shafts 44 and 45 (FIG. 1), hereinafter referred to as axle shafts.

The differential assembly 26 includes the gearset 42 that is operable for transferring drive torque from the differential casing 40 to the output shafts 44 and 45 (FIG. 1) in a manner that facilitates speed differentiation therebetween. Gearset 42 may be a helical-type and may be disposed within the internal chamber 48. The gearset 42 includes a pair of side gears 68*a* and 68*b*. The side gears have internal splines 70*a* and 70*b* meshed with external splines, not specifically shown, on the corresponding output shafts 44 and 45 (FIG. 1). In addition, the side gears 68*a* and 68*b* include axial hubs 78*a* and 78*b*, respectively, which are retained in corresponding annular sockets 82*a* and 82*b*, formed in the main body 46 and the end cap 50 of the differential casing 40. The side gears 68*a* and 68*b* also include annular chambers 84*a* and 84*b*.

A spacer 86 may be located between the side gears 68*a* and 68*b* for limiting the amount of axial endplay of the side gears 68*a* and 68*b* within the differential case 40. A cross pin 90 extends through a passage 92 in the spacer 86 and controls endplay of the axle shafts 44 and 45 (FIG. 1). The outer cylindrical surface of cross pin 90 is sized to closely fit passage 92. As such, the longitudinal location of cross pin 90 is defined by the position of passage 92. C-shaped retainers, or C-clips 94, may be retained in the annular chambers 84*a* and 84*b* for preventing the axle shafts 44 and 45, respectively, from becoming disengaged with the side gears 68*a* and 68*b*. Cross pin 90 is radially retained in position by a longitudinally extending threaded fastener 96. Fastener 96 may extend through an aperture 98 formed in cross pin 90 as shown in FIG. 2 or may alternatively be located adjacent to an end face 99 of an alternate cross pin 90*a* shown in FIG. 3. As a result of the spacer 86 and fastener 96 being operable to locate cross pin 90, differential casing 40 need not include specially machined areas to locate and retain cross pin 90 and cross pin 90 need not contact casing 40.

The gearset 42 includes four sets of pinion pairs, 100*a* and 100*b*, 102*a* and 102*b*, 104*a* and 104*b* and 106*a* and 106*b*, respectively. For clarity, the pinion pairs 100*a* and 100*b*, 102*a* and 102*b*, 104*a* and 104*b* and 106*a* and 106*b* are hereinafter referred to as a first, second, third and fourth pair of pinion gears 100, 102, 104 and 106, respectively. Brake shoes 100*a*'-106*b*' cooperate with respective pinion gears 100-106.

The four sets of pinion gear pairs 100-106 are rotatably supported in complementary sets of pinion bores 110*a* and 110*b*, 112*a* and 112*b*, 114*a* and 114*b*, and 116*a* and 116*b*. The complementary sets of pinion bores 110*a* and 110*b*, 112*a* and 112*b*, 114*a* and 114*b*, and 116*a* and 116*b* are hereinafter referred to as a first, second, third and fourth pair of pinion bores 110, 112, 114, and 116, respectively. The pinion bores 110-116 are formed in raised hub segments 120 of the main body 46. The pinion bores 110-116 are arranged in paired sets such that they communicate with each other and with the internal chamber 48. In addition, the pinion bores 110-116 are aligned substantially parallel to the rotational axis A of the axle shafts 44 and 45 (FIG. 1).

A window opening 124 may be arranged on the differential casing 40 between the first and the fourth pair of pinion gears 100 and 106. C-clips 94 may be inserted through window opening 124 when drivingly coupling axle shafts 44 and 45 to differential assembly 26.

With reference to FIGS. 2, 3 and 4, spring washers 126 and thrust blocks 128 are positioned on axial hubs 78*a* and 78*b* of side gears 68*a* and 68*b*, respectively. One of the spring washers 126 is positioned within a recess 130 formed in cap 50. The other spring washer 126 is positioned within a recess 132 formed in body 46 as part of internal chamber 48. Recesses 130 and 132 maintain axial position of spring washers 126 to assure that clearance exists between axial hubs 78*a*, 78*b* and spring washers 126. Each thrust block 128 is positioned between one of spring washers 126 and one of side gears 68*a*, 68*b*. It should be appreciated that recesses 130, 132 may alternatively be formed in thrust blocks 128 rather than in differential casing 40.

Each spring washer 126 includes a substantially planar land 134 defining an opening 136. A frustro-conical portion 138 radially outwardly extends from planar land 134 and terminates at an outer edge 140. Each spring washer 126 may be constructed from a resilient material such as spring steel or an elastomeric plastic.

Each thrust block 128 is shaped as a ring having a first substantially planar contact surface 150 and an opposite substantially planar contact surface 152. The contact surfaces extend substantially parallel to one another. An inner cylindrical wall 154 extends between planar surfaces 150, 152. Thrust block 128 also includes an outer cylindrically shaped surface 156 extending from first surface 150 to second surface 152. Four sets of scallops 160*a* and 160*b*, 162*a* and 162*b*, 164*a* and 164*b* and 166*a* and 166*b* interrupt outer cylindrical surface 156. The complementary sets of scallops are hereinafter referred to as first, second, third and fourth pairs of scallops 160, 162, 164 and 166, respectively. The scallops 160-166 are sized and positioned to receive pinion gear pairs 100, 102, 104 and 106, respectively.

Pairs of troughs 170*a* and 170*b*, 172*a* and 172*b*, 174*a* and 174*b* and 176*a* and 176*b* are formed on contact surface 150 and extend in a radial direction from inner cylindrical wall 154 to a corresponding scallop 160-166. In similar fashion, another four sets of trough pairs 180 through 186 radially extend from inner cylindrical wall 154 to outer cylindrical surface 156 along contact surface 152. The four sets of troughs are identified as 180*a*, 180*b*, 182*a*, 182*b*, 184*a*, 184*b*, 186*a* and 186*b*. The troughs function to allow lubricant to pass therethrough.

After assembly of differential assembly 26, thrust blocks 128 are axially moveable within chamber 48 but restricted from rotating relative to casing 40 by pinion pairs 100-106. Spring washers 126 are in a compressed state loaded against thrust blocks 128 to transfer load through side gears 68*a* and 68*b* to spacer 86. The friction between side gears 68*a*, 68*b* and spacer 86 restricts relative rotation between the side gears 68*a*, 68*b* and casing 40 to provide limited slip differentiation. Thrust blocks 128 may be constructed from a number of materials, including plastic, having resistance to compression as well as resistance to wear due to direct sliding contact with side gears 68*a* and 68*b*.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A differential assembly for a vehicle, comprising:

a differential casing defining a cavity;

a first side gear received in the differential cavity;

a second side gear received in the differential cavity;

a plurality of first pinion gears meshingly engaged with the first side gear;

a plurality of second pinion gears meshingly engaged with the second side gear, each second pinion gear also being meshingly engaged with a corresponding one of the first pinion gears;

a first thrust block received between the differential casing and the first side gear on a side of the differential casing opposite the second side gear, the first thrust block having circumferentially spaced apart recesses; and a spring biasing the first thrust block into engagement with the first side gear;

wherein the first side gear is disposed between the spring and the second side gear such that the spring biases the first side gear toward the second side gear; and wherein at least one of the first pinion gears is received in an associated one of the recesses in the first thrust block to thereby inhibit rotation of the first thrust block relative to the differential casing.

2. The differential assembly of claim 1 wherein the first side gear includes an axial hub that is received into an aperture in the first thrust block.

3. The differential assembly of claim 2 wherein the spring is positioned within a spring recess formed in the differential casing.

4. The differential assembly of claim 2 wherein the first thrust block includes a plurality of radially extending troughs extending from the aperture to an outer edge of the first thrust block.

5. The differential assembly of claim 1 wherein the spring is positioned within a spring recess formed in the differential casing.

6. The differential assembly of claim 1 further comprising a second thrust block received between the differential casing and the second side gear on a side of the differential casing opposite the first side gear, the second thrust block having circumferentially spaced apart recesses, wherein at least one of the second pinion gears is received in an associated one of the recesses in the second thrust block to thereby inhibit rotation of the second thrust block relative to the differential casing.

7. The differential assembly of claim 6 wherein the first pinion gears comprise a gear member and a brake shoe.

8. The differential assembly of claim 7 wherein the brake shoes of the first pinion gears are received into respective ones of the recesses in the second thrust block.

9. The differential assembly of claim 1 wherein the second pinion gears comprise a gear member and a brake shoe.

10. The differential assembly of claim 9 wherein the brake shoes of the second pinon gears are received into respective ones of the recesses in the first thrust block.

11. The differential assembly of claim 1 further including a spacer positioned between the first and second side gears, the spring transferring load through the spacer and the other of the first and second side gears.

12. The differential assembly of claim 11 further including a cross pin extending through apertures formed in the spacer.

13. The differential assembly of claim 12, wherein the cross pin is disposed generally perpendicular to an axis of the differential casing about which the first and second side gears are disposed for rotation relative to the differential casing.

14. The differential assembly of claim 13 wherein the cross pin is not fixed to the differential casing.

15. The differential assembly of claim 1 wherein the casing includes a body having a flange and a cap coupled to the body at a location radially inward of the flange.

16. The differential assembly of claim 1 wherein the first thrust block is at least partly formed of plastic.

17. A differential assembly for a vehicle, comprising:

a differential casing rotatable about an axis, the differential casing defining a cavity;

a first side gear received in the differential cavity;

a second side gear received in the differential cavity;

a plurality of first pinion gears meshingly engaged with the first side gear;

a plurality of second pinion gears meshingly engaged with the second side gear, each second pinion gear also being meshingly engaged with a corresponding one of the first pinion gears;

a spacer slidably positioned in the differential casing between the first and second side gears, the spacer being configured to limit end play of the first and second side gears within the casing; and a thrust block disposed between the differential casing and the first side gear on a side of the first side gear opposite the spacer, the thrust block having circumferentially spaced apart recesses through which the first pinion gears are received.

18. The differential assembly of claim 17 further comprising a cross pin received through the spacer, wherein the cross pin is not fixed to the differential casing.

19. The differential assembly of claim 17 wherein the second pinion gears comprise a gear member and a brake shoe.

20. The differential assembly of claim 19 wherein the brake shoes of the second pinion gears are received into respective ones of the recesses in the thrust block.

* * * * *